Sept. 28, 1965  J. R. CHIVERS  3,208,371
TOASTER HAVING DAMPED CARRIAGE MOVEMENT
Filed June 12, 1963  4 Sheets-Sheet 1

*INVENTOR.*
James R. Chivers
BY
Robert T. French
ATTORNEY

United States Patent Office 3,208,371
Patented Sept. 28, 1965

3,208,371
TOASTER HAVING DAMPED CARRIAGE MOVEMENT
James R. Chivers, Madison Township, Richland County, Ohio, assignor to Westinghouse Electric Corporation, Pittsburgh, Pa., a corporation of Pennsylvania
Filed June 12, 1963, Ser. No. 287,270
3 Claims. (Cl. 99—329)

This invention relates to electric toasters of the automatic or "pop up" type and concers particularly such toasters in which the bread carriage is spring-biased to the extreme upper or non-toasting position.

Many automatic electric toasters in which the toasted bread pops up to a partially exposed position upon completion of the toasting operation undergo a noticeable jarring each time that happens. This has several disadvantages, such as moving the toaster slightly on the supporting surface each time (with a possible cumulative effect of "walking" it over the edge of a supporting shelf, table, or the like), dislodging an excessive amount of crumbs or even bits of crust from the toasted bread and possibly lodging the bread in such manner that it is difficult to remove from the toaster, or even decreasing the life of the heating element. Means are known for moving the bread carriage at a relatively uniform rate and for damping the final movement of a carriage moving at a non-uniform rate, but at a sacrifice of simplicity in construction and dependability in operation.

A primary object of the present invention is the provision of an automatic electric toaster with dependable carriage-damping means utilizing existing features of toaster construction with a minimum of modification.

Another object is damping of the movement of the bread carriage of an automatic electric toaster over a major portion of its travel from toasting to extreme non-toasting position.

A further object is the combination of carriage-damping means in an automatic electric toaster.

Other objects of this invention, together with means and methods for attaining the various objects, will be apparent from the following description and the accompanying diagrams of a preferred embodiment of the invention.

In general, the objects of the present invention are accomplished by providing an electric toaster of automatic or "pop up" type with carriage-damping means including mutually contiguous members adapted to remain in contact with one another throughout movement of the carriage between the toasting and non-toasting positions and adapted, by reason of friction with one another, to retard movement of the carriage at the urging of the biasing means from toasting to non-toasting position.

The invention contemplates particularly providing one of the mutually contiguous members in the form of a guide rod along which the carriage moves between toasting and non-toasting positions and the other member in the form of a washer fitting snugly on the guide rod and being moved thereon upon movement of the carriage, together with a compression spring compressed by the carriage against the washer when the carriage moves from toasting to non-toasting position.

Figure 1:
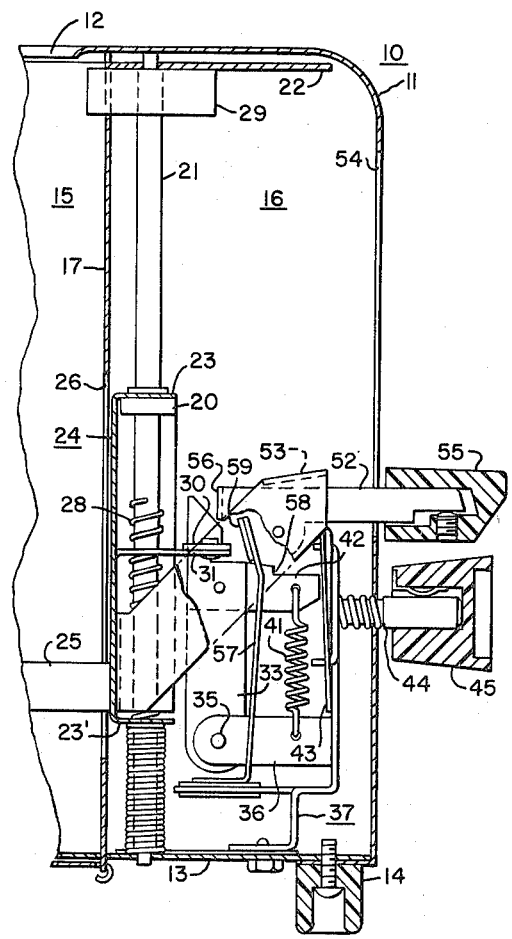
FIG. 1 is a side elevation, partly in section, of a portion of a toaster embodying the present invention, with the bread carriage depressed in toasting position.

FIG. 1 shows, in side elevation and partly in section, a portion of toaster 10 having a fixed frame including a housing 11 inverted over and attached to a base 13 supported on feet 14 (one visible in this view). The top of the housing has one or more slots 12 (part of one being visible) therein to receive slices of bread or the like for toasting in the oven or heating compartment 15 located therebelow. The heating compartment occupies most of the space inside the housing and is separated from a smaller control compartment 16 by a partition 17. The structural features of the present invention are located in or about the control compartment and are described and illustrated in detail. The heating compartment and means for heating it are wholly conventional and, being well known, are not further illustrated or described.

Figure 2:
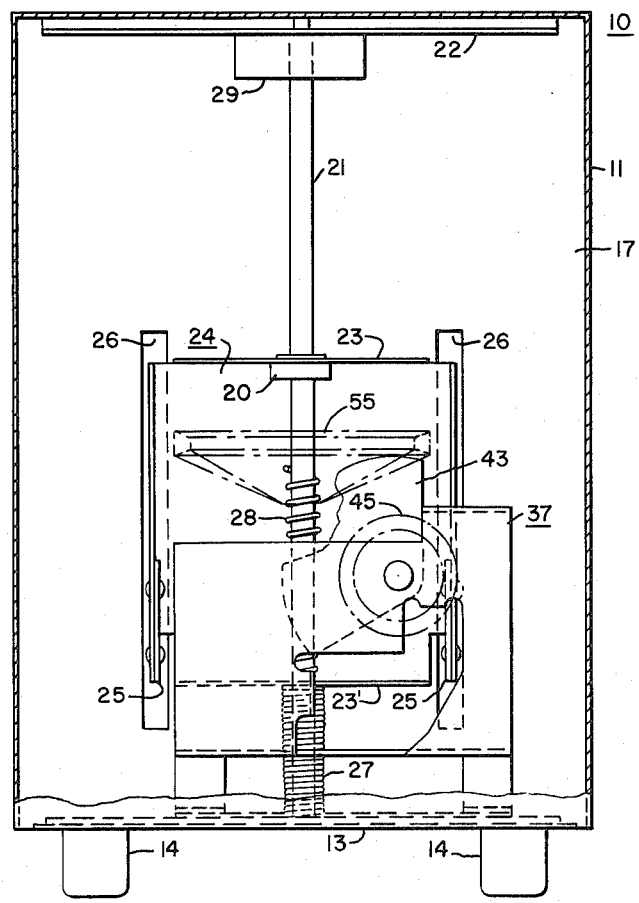
FIG. 2 is an end elevation, partly cut away and in section, corresponding to the the side elevation of FIG. 1.
Figure 3:
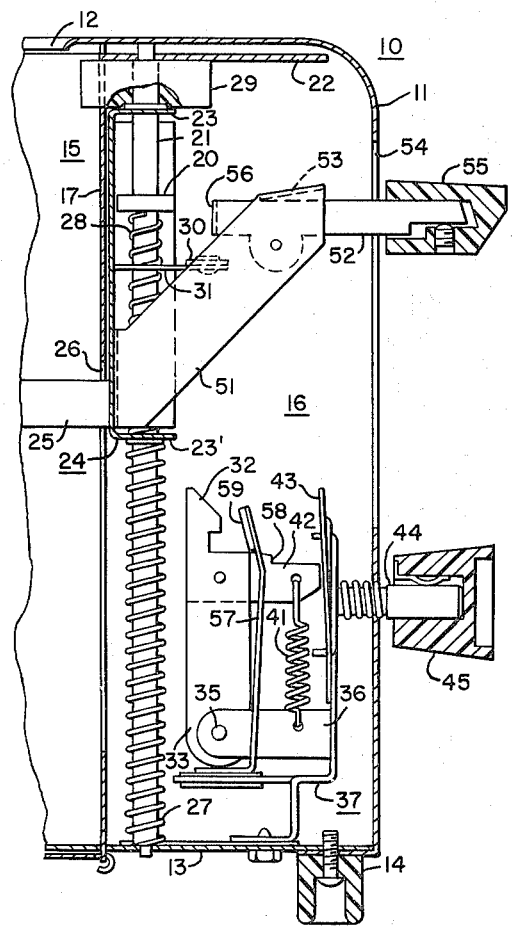
FIG. 3 is a side elevation of the same apparatus, with the bread carriage in extreme upper or non-toasting position.
Figure 4:
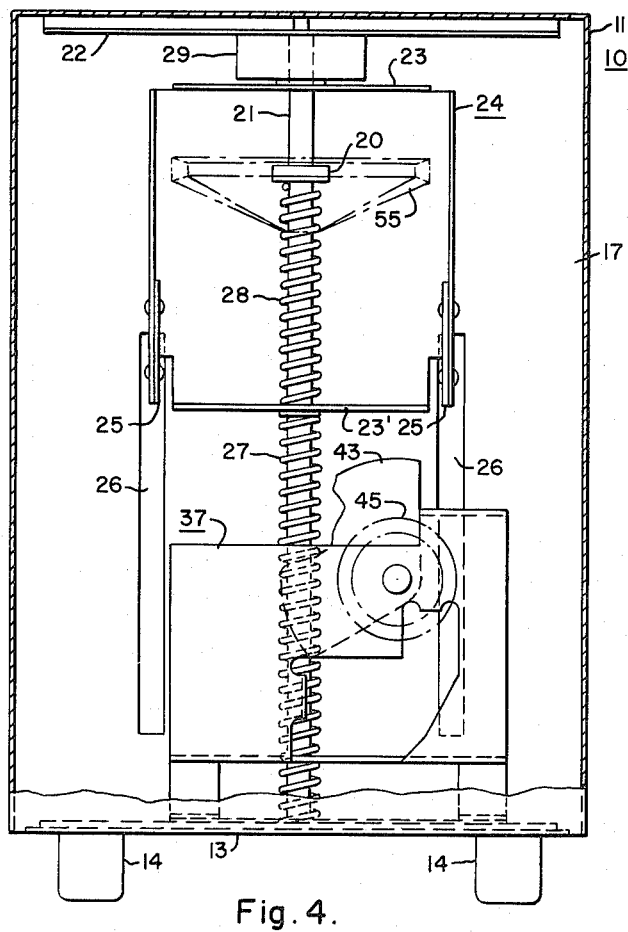
FIG. 4 is an end elevation, also partly cut away and in section, of the apparatus of the preceding views, corresponding to the side elevation of FIG. 3.

FIG. 2 shows, in end elevation (partly cut away and in section) structural elements supported by the frame, most of which were visible in side elevation in FIG. 1. An elongated post or guide rod 21 extends vertically from an aperture in the base 13 to an aperture in a horizontal sheet 22 supported in part by the partition 17 and spaced from the overlying portion of the housing 11. A carriage 24 is mounted for vertically reciprocating movement on the guide rod, which extends through apertures fitted with grommets in top and bottom flanges 23, 23' thereof. A pair of bread-supporting bars 25, which are attached to opposite side flanges of the carriage, extend horizontally through a pair of vertical slots 26 in the partition 17 and into the heating compartment. A biasing spring 27 surrounding the guide rod 21 below the bottom flange of the carriage is compressed between that flange and the base 13 in the illustrated lower position of the carriage, which is the toasting position. A helical compression spring 28 surrounds a portion of the guide rod between the top and bottom flanges of the carriage and, being relatively loose about the guide rod (as well as shorter than the visible portion thereof between the flanges). A resilient washer 20 with elastic physical properties fits snugly about the guide rod between the flanges and above the spring 28; in this view the washer is located just below top flange 23 and against the underside thereof. A resilient bumper member 29 surrounds the upper portion of the post immediately below the horizontal sheet 22.

The mechanism for latching the carriage 24 in the toasting position and for unlatching it is essentially like that disclosed by B. F. Parr in U.S. Patent 3,029,725 although the details differ somewhat. The carriage 24 has a central horizontal bracket 31 extending therefrom with an aperture therein (not shown directly) adapted to receive, and an adjacent wear strip 30 to retain, a hook 32 formed at the upper end of an upstanding latch member 33 supported at its lower end for pivotal and limited vertical motion, on pin 35. The pin is retained in a support arm 36 affixed to a superstructure 37, which is fastened to the base 13. A biasing spring 41 for the latch member is affixed at its lower end to the support arm 36 and at its upper end to an arm 42, which is affixed to the latch member and extends substantially horizontally therefrom in the direction in which the hook 32 extends from the latch member (to the right in FIG. 1). A desegmented disc cam 43, affixed to one end of a rotatable shaft 44, is juxtaposed to the free end of the arm 42, which acts as a cam follower, controlling the degree of engagement of the hook 32 with the horizontally extending brack 31. The other end of the shaft extends through the housing 11 to the exterior, where it carries a light-dark control in the form of rotatable knob 45.

A bracket 51 extending obliquely from the carriage 24 carries a lever arm 52 pivotally thereon, the degree of pivoting being limited by a flange 53 thereon overlying a portion of the upper edge of the lever arm. This lever arm extends through a vertical slot 54 in the housing 11 and carries a fixed knob 55 on its exterior end. Its flanged interior end 56 is juxtaposed in the toasting position to the tapered upper edge of the hook 32. A yoke-shaped bimetallic member 57 affixed at its lower ends to the superstructure 37 (but electrically insulated therefrom) extends upward flanking the latch member 33 and bridges the arm 42 extending therefrom, which has notch 58 in the upper surface thereof. The bridging portion of the yoke-shaped bimetallic member is faced with electrically insulating strip 59 on the side toward the hook 32. Two pairs of contacts (not shown) supported on the superstructure 37 are actuated by a portion (also not shown) of the latch member 33 in now conventional manner make the various electrical connections essential to operation of the toaster. Closing of one pair of contacts establishes a circuit through both the heating coil (not shown) for the heating compartment and the yoke-shaped bimetallic member, and closing of the other pair of contacts establishes a circuit through the heating coil only.

Operation of the latching mechanism is readily understood. Depression of the fixed knob 55 by the toaster operator lowers the carriage 24, whereupon bread carried on the attached bread-supporting bars drops out of sight into the heating compartment, and the hook 32 on the latch member 33, biased toward the engaged position by the spring 41 engages the bracket 31 on the carriage and retains it in such lowered toasting position. In this position both the heating coil and the yoke-shaped bimetallic member 57 are energized. As the bimetallic member heats from the flow of electrical current therethrough, it deflects at its bridging portion toward the notch 58 in the arm 42 attached to the latch member, eventually permitting the latch member to rise on its pivot pin by the depth of the notch at the urging of the compressed spring 27 against the bottom flange of the carriage, whereupon the circuit to the bimetallic member is interrupted but the flow of current to the heating coil is continued. This completes the first or heating portion of the cycle of operation, which is of the so-called "heat-up cool-down" type.

As the bimetallic member cools, it deflects toward the latch member and, being engaged in the notch on the attached arm 42, pivots the latch member sufficiently to disengage the hook 32 from the bracket 31, whereupon the carriage 24 is forced upward by the compressed spring 27 and all current flow is interrupted. The "heat-up cool-down" cycle is then complete.

Lifting of the knob 55 also will release the carriage from toasting position at any time by bringing the angled interior end 56 of the lever arm 52 into contact with the tapered edge of the hook 32, disengaging it. In any event, as the carriage rises, propelled by expansion of the compressed spring 27, toward the uppermost or extreme non-toasting position (in which bread carried on the supporting bars 25 is partially exposed outside the slots 12 in the heating compartment 15), the carriage-damping means of the present invention comes into play.

As the carriage begins to rise, the compression spring 28 first slides freely on the guide rod 21 until the upper end of the spring comes into contact with the underside of the washer 20, which has remained stationary on the guide rod since the carriage was last depressed to toasting position. The spring 28 becomes compressed somewhat between the washer and the bottom flange 23' of the carriage as the carriage continues upward slowed thereby. Then the washer begins to slide upward and continues to do so until finally the top flange 23 of the carriage comes into contact with the resilient bumper member 29 located at the top of the guide rod 21 on which the carriage rides, cushioning the residual shock of that contact.

The compression spring 28, which cushions the transmission of the upward movement of the carriage 24 to the washer 20, preferably is (as shown) somewhat shorter than the portion of the guide rod 21 visible between the top and bottom flanges 23, 23' of the carriage. This ensures a rapid initial movement of the carriage (and quick breaking of electrical circuit to the heating element) before the slowing or damping of the carriage movement by compression of the spring against the washer 20 and sliding frictional engagement of the washer with the guide rod. Similiarly, upon subsequent manual depression of the knob 55 by the toaster operator to begin another toasting cycle, the carriage is free to travel a comparable distance before moving the washer, in this instance directly by contact with the top flange 23 rather than with the spring 28. The present invention requires no unusual materials or methods of production. The washer may be composed of any elastic material having suitable frictional properties, usually a synthetic elastomer (e.g., chloroprene, polysulfides, and silicone rubbers) resistant to the relatively high temperatures encountered in an electric toaster.

The preferred apparatus embodiment of this invention, as illustrated and described, may be modified in structure of function without departing from the inventive concept. Parts may be combined or subdivided, added to or substituted for one another, and other modifications made while retaining advantages and benefits of the invention, which is defined in the following claims.

I claim as my invention:

1. In a toaster, a fixed frame, a bread carriage movable relative thereto between toasting and non-toasting positions, means biasing the carriage from toasting to non-toasting position, guide means for the carriage including a guide rod along which the carriage moves during movement between toasting and non-toasting positions, a washer fitting snugly about the guide rod, the carriage including a pair of apertured members receiving the guide rod slidably therein and spaced apart with the washer located therebetween, and a compression spring of length approaching the dimensional difference between the spacing apart of the apertured elements of the carriage and the thickness of the washer located therebetween, the spring being located about the guide rod and between the washer and the apertured member that moves toward the apertured element when the carriage moves from the toasting position toward a non-toasting position, whereupon movement of the carriage from toasting to non-toasting position compresses the spring against the washer and moves the washer in frictional engagement with the guide rod, thereby damping such movement of the carriage.

2. In a a toaster, a fixed frame, a carriage movable relative thereto from non-toasting to toasting position and back again, a guide rod along which the carriage moves from each position to the other, a first compression spring surrounding the guide rod and adapted to bias the carriage from the toasting position to the non-toasting position, one end of the spring bearing against a portion of the frame and the other end bearing against a first portion of the carriage, the carriage having also a second portion spaced from the first portion and aligned therewith in the direction of movement of the carriage, a washer for damping the carriage movement surrounding and frictionally engaging the guide rod between the first and second portions of the carriage, and a second compression spring surrounding the guide rod between the washer and the first portion of the carriage.

3. In a toaster, a fixed frame, a carriage movable relative thereto from non-toasting to toasting position and back again, a guide rod along which the carriage moves from each position to the other, a first compression spring surrounding the guide rod and adapted to bias the carriage from the toasting position to the non-toasting position, one end of the spring bearing against a portion of the frame and the other end bearing against a first portion of the carriage, the carriage having also a second portion spaced from the first portion and aligned therewith in the direction of movement of the carriage, an elastomeric washer for damping the carriage movement snugly surrounding the guide rod between the first and second portions of the carriage, and a second compression spring surrounding the guide rod between the washer and the first portion of the carriage, the dimensional difference between the spacing of the respective portions of the carriage from one another and the sum of the length of the second compression spring and the thickness of the washer being exceeded by the distance through which the carriage moves between toasting and non-toasting positions.

References Cited by the Examiner
UNITED STATES PATENTS

| | | | |
|---|---|---|---|
| 2,319,997 | 5/43 | Ireland | 99—3991 |
| 2,557,512 | 6/51 | Padelford | 99—329 |
| 2,638,164 | 5/53 | Victor | 99—327 |
| 3,029,725 | 4/62 | Parr | 99—329 |

ROBERT E. PULFREY, *Primary Examiner.*

LAWRENCE CHARLES, *Examiner.*